United States Patent
Alden et al.

(10) Patent No.: US 10,926,624 B2
(45) Date of Patent: Feb. 23, 2021

(54) ACCESSORY SUPPORT BRACKETS WITH AIRFLOW PASSAGES

(71) Applicant: CUMMINS INC., Columbus, IN (US)

(72) Inventors: Glen R. Alden, Columbus, IN (US); Kristopher D. Bunk, Warren, IN (US); Christopher Swearingen, Jamestown, NY (US); John E. Zellhart, Columbus, IN (US); Jonathan Moran, Columbus, IN (US); Suhas Subramanya Bhat, Peoria, IL (US); Robert D. Rogers, Westport, IN (US); George D'Angelo, Jamestown, NY (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/691,934

(22) Filed: Nov. 22, 2019

(65) Prior Publication Data

US 2020/0086735 A1 Mar. 19, 2020

Related U.S. Application Data

(62) Division of application No. 16/073,003, filed as application No. PCT/US2016/015919 on Feb. 1, 2016, now Pat. No. 10,576,818.

(51) Int. Cl.
*B60K 13/06* (2006.01)
*B60K 5/12* (2006.01)
(Continued)

(52) U.S. Cl.
CPC .............. *B60K 13/06* (2013.01); *B60K 5/12* (2013.01); *B60K 13/02* (2013.01); *F02B 67/06* (2013.01);
(Continued)

(58) Field of Classification Search
CPC .......... B60K 13/06; B60K 13/02; B60K 5/12; B60K 25/02; B60K 2025/022; F02B 67/06; F02M 35/10091
See application file for complete search history.

(56) References Cited

U.S. PATENT DOCUMENTS

| | | | |
|---|---|---|---|
| 3,730,147 A | * | 5/1973 | Buchwald ................ F01P 5/10 123/41.44 |
| D250,805 S | | 1/1979 | Mygind et al. |

(Continued)

FOREIGN PATENT DOCUMENTS

| | | |
|---|---|---|
| CN | 1576537 | 2/2005 |
| CN | 202789120 | 3/2013 |

(Continued)

OTHER PUBLICATIONS

International Search Report and Written Opinion for PCT Application No. PCT/US2016/15919, dated Jun. 9, 2016, 10 pages.
(Continued)

*Primary Examiner* — Jacob B Meyer
(74) *Attorney, Agent, or Firm* — Foley & Lardner LLP (57) ABSTRACT

Methods and systems relating to an internal combustion engine support bracket are disclosed. The engine bracket includes a housing defining a fluid passage configured to be in fluid receiving communication with an upstream aperture of the housing and in fluid providing communication with a downstream aperture of the housing. The engine bracket also includes at least one mounting platform with fasteners configured to removably engage an accessory device of an internal combustion engine.

11 Claims, 4 Drawing Sheets

(51) Int. Cl.
*F02B 67/06* (2006.01)
*B60K 13/02* (2006.01)
*F02M 35/10* (2006.01)
*B60K 25/02* (2006.01)

(52) U.S. Cl.
CPC ....... *F02M 35/10091* (2013.01); *B60K 25/02* (2013.01); *B60K 2025/022* (2013.01)

(56) References Cited

U.S. PATENT DOCUMENTS

| | | | |
|---|---|---|---|
| 4,440,555 | A | 4/1984 | Chichester |
| 5,074,255 | A | 12/1991 | Ebesu et al. |
| 5,086,858 | A | 2/1992 | Mizuta et al. |
| 5,245,960 | A | 9/1993 | Macier et al. |
| 5,301,767 | A | 4/1994 | Shiohara |
| D362,384 | S | 9/1995 | Middlebrook |
| D383,140 | S | 9/1997 | Middlebrook |
| 6,213,826 | B1 | 4/2001 | Koishikawa et al. |
| 6,244,239 | B1 | 6/2001 | Sisco et al. |
| 6,435,157 | B1* | 8/2002 | Zaremba ............. F02B 67/06 123/195 C |
| 6,588,524 | B2 | 7/2003 | Keen et al. |
| 6,780,215 | B2 | 8/2004 | Keen et al. |
| 7,152,564 | B2 | 12/2006 | Ishigami et al. |
| 7,185,639 | B1 | 3/2007 | Roche et al. |
| 7,210,674 | B2 | 5/2007 | Maeno et al. |
| D582,431 | S | 12/2008 | Chisenhall et al. |
| 7,647,906 | B2 | 1/2010 | Takada et al. |
| 7,704,174 | B2 | 4/2010 | Takada et al. |
| 7,779,950 | B2 | 8/2010 | Hoeve et al. |
| D731,554 | S | 6/2015 | Turuvekere Gurudatt |
| 9,296,445 | B2 | 3/2016 | Kontani |
| 9,347,408 | B2 | 5/2016 | Kontani et al. |
| D772,041 | S | 11/2016 | Miner et al. |
| D791,837 | S | 7/2017 | Alden et al. |
| D791,838 | S | 7/2017 | Alden et al. |
| 9,739,245 | B2 | 8/2017 | Yamashita et al. |
| 2002/0179352 | A1 | 12/2002 | Keen et al. |
| 2003/0116372 | A1 | 6/2003 | Keen et al. |
| 2005/0022772 | A1 | 2/2005 | Ishigami et al. |
| 2005/0127586 | A1 | 6/2005 | Maeno et al. |
| 2007/0251479 | A1 | 11/2007 | Takada et al. |
| 2007/0277642 | A1 | 12/2007 | O'Neill et al. |
| 2007/0277761 | A1 | 12/2007 | Takada et al. |
| 2008/0054682 | A1 | 3/2008 | Ellison et al. |
| 2008/0190683 | A1 | 8/2008 | Hoeve |
| 2009/0321202 | A1 | 12/2009 | Hamada et al. |
| 2012/0067323 | A1 | 3/2012 | Patwardhan et al. |
| 2014/0238330 | A1 | 8/2014 | Matsuzaki et al. |
| 2015/0274239 | A1 | 10/2015 | Kontani |
| 2015/0275832 | A1 | 10/2015 | Kontani et al. |
| 2017/0089308 | A1 | 3/2017 | Yamashita et al. |
| 2017/0218808 | A1 | 8/2017 | Kurokawa et al. |
| 2018/0363606 | A1 | 12/2018 | Balaji et al. |
| 2019/0009669 | A1 | 1/2019 | Alden et al. |

FOREIGN PATENT DOCUMENTS

| | | |
|---|---|---|
| FR | 2938215 | 5/2010 |
| JP | 2005-264893 | 9/2005 |

OTHER PUBLICATIONS

Non-Final Office Action on U.S. Appl. No. 16/073,003, dated Aug. 21, 2019.

Notice of Allowance on U.S. Appl. No. 16/073,003, dated Nov. 12, 2019.

U.S. Office Action on U.S. Appl. No. 29/553,378, dated Jan. 11, 2017.

Supplementary European Search Report from EP Patent Application No. 16889575.3, dated Nov. 15, 2019, pp. 1-7.

Office Action for CN Application No. 201680080268.8, dated Sep. 29, 2020. (English translation).

* cited by examiner

FIG. 4 understand# ACCESSORY SUPPORT BRACKETS WITH AIRFLOW PASSAGES

CROSS-REFERENCE TO RELATED APPLICATIONS

This application is a divisional of U.S. patent application Ser. No. 16/073,003, filed Jul. 26, 2018, which is the U.S. national phase of PCT Application No. PCT/US2016/015919, filed Feb. 1, 2016, the entire disclosures of which are incorporated herein by reference.

TECHNICAL FIELD

The present disclosure relates to internal combustion engines.

BACKGROUND

Internal combustion engines commonly use a portion of an air intake flow to feed an air compressor for various functionalities. Due to space restrictions within a corresponding engine bay, and orientation and positioning of other components of an engine, among other factors, the air compressor may be disposed at a location on the engine which is at distance relative to an inlet of an intake system. As a result, circuitous arrangements of conduits may be needed to provide airflows from the intake system to the air compressor without obstructing or otherwise interfering with other components of the engine.

SUMMARY

One embodiment relates to an internal combustion engine support bracket. The bracket includes a housing defining a fluid passage configured to be in fluid receiving communication with an upstream aperture of the housing and in fluid providing communication with a downstream aperture of the housing. The bracket further includes at least one mounting platform with fasteners configured to removably engage an accessory device of an internal combustion engine.

Another embodiment relates to an accessory support and air routing system. The system includes an inlet coupler configured to engage and receive a portion of an airflow from an intake system. The system further includes a support bracket. The support bracket includes a housing defining a fluid passage configured to be in fluid receiving communication with an upstream aperture of the housing and in fluid providing communication with a downstream aperture of the housing. The support bracket further includes at least one mounting platform with fasteners configured to removably engage an accessory device of an internal combustion engine. The system includes a first conduit in fluid receiving communication with the inlet coupler and in fluid providing communication with the upstream aperture of the support bracket. The system further includes a second conduit in fluid receiving communication with the downstream aperture of the support bracket and in fluid providing communication with an end coupler configured to engage an air compressor inlet.

A further embodiment relates to a method of forming an internal combustion engine support bracket. The method includes forming a semi-permanent passage mold corresponding to a fluid passage configured to be in fluid receiving communication with an upstream aperture and in fluid providing communication with a downstream aperture. The method further includes forming a bracket mold corresponding to a support bracket comprising at least one mounting platform with fasteners configured to removably engage an accessory device of an internal combustion engine. The method includes positioning the semi-permanent passage mold within the bracket mold. The method further includes pouring casting fluid into the bracket mold. The method includes removing the bracket mold and the semi-permanent passage mold, wherein the semi-permanent passage mold is broken down prior to removal.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, accessory support brackets with internal air passages. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1A:
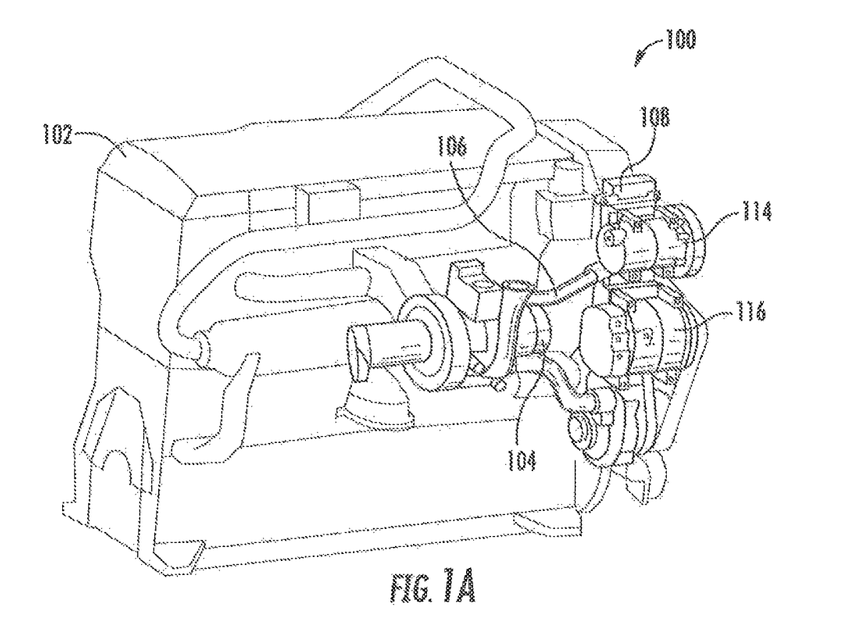
FIGS. 1A and 1B show perspective views of an engine with an installed accessory support and air routing system, according to an example embodiment.
Figure 1B:
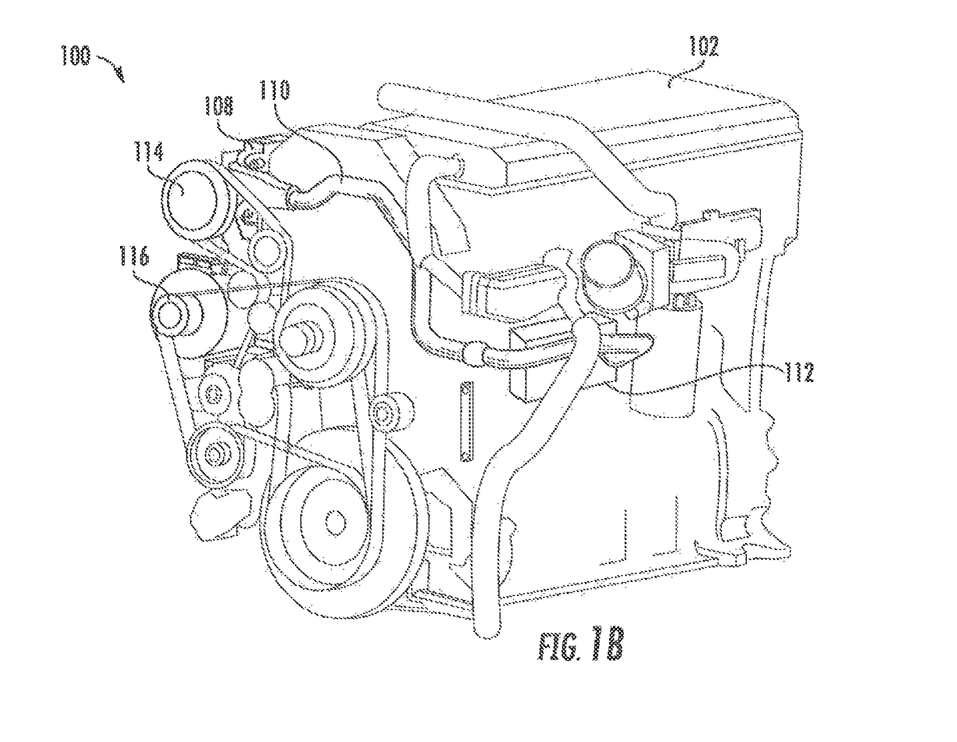

Referring to FIGS. 1A and 1B, an accessory support and air routing system 100 is shown coupled to an internal combustion engine 102. The engine 102 is a powerplant configured to cyclically collect and ignite volumes of air and fuel to generate a mechanical force. Air is routed from the atmosphere through an associated intake system including the system 100. In some arrangements, the intake system further includes a forced induction device (e.g., a turbocharger or a supercharger) structured to mechanically force greater amounts of air into the intake system.

The system 100 is configured to provide a fluid passage from an inlet of the intake system to an air compressor 112. The system 100 includes an inlet coupler 104, a first conduit 106, a support bracket 108, and a second conduit 110, which together form a continuous air passage from the inlet of the intake system to the air compressor 112. Although the arrangements shown in the figures and discussed herein show the system 100 as applied providing air to the air compressor 112, those of ordinary skill in the applicable art should recognize that the system 100 may be used to provide fluid passages in various contexts relating to the operation of the engine 102.

The inlet coupler 104 is structured to provide a fluid providing aperture between an upstream portion of the intake system of the engine 102 and the system 100. Here, the inlet coupler 104 is shown as annularly disposed about an inlet portion of a turbocharger. The inlet coupler 104 is coupled about an exterior circumference of the turbocharger inlet portion and defines a central bore allowing passage of a flow of air to the turbocharger. An upstream conduit of the upstream portion of the intake system may also be coupled to the inlet portion of the turbocharger and/or the inlet coupler 104. In operation, air may flow from the upstream conduit, through the central bore of the inlet coupler 104, and through the inlet portion to the turbocharger. A wall portion of the inlet coupler 104 includes a side aperture in fluid communication with the central bore of the inlet coupler 104 that allows a portion of the flow of air to be diverted from the central bore into the system 100. As such, the inlet coupler 104 may be structured to allow fluid to flow to both a turbocharger (e.g., via the central bore), and to the system 100 (e.g., via the side aperture).

The first conduit 106 is engaged to the inlet coupler 104 at a first end of the first conduit 106 and in fluid receiving communication with the side aperture. The first conduit 106 is also engaged to and in fluid providing communication with the support bracket 108 at a second end of the first conduit 106.

The support bracket 108 is coupled to the engine 102, and provides a housing that defines a mounting point for various accessory devices as well as defining a segment of the airflow passage from the inlet coupler 104 to the air compressor 112. In the arrangement shown in FIGS. 1A and 1B, the support bracket 108 housing is coupled to and wraps around a corner portion of the engine 102. In other arrangements, the support bracket 108 may be disposed along one side of the engine 102.

As shown, various accessory devices may be coupled to the support bracket 108. For example, a Freon compressor 114 and an alternator 116 may each be mounted to the support bracket 108. The support bracket 108 housing may be formed with mounting points such that driven portions of each of the Freon compressor 114 and the alternator 116 may be properly positioned within an accessory driveline (e.g., associated pulleys may be coupled to a driven belt).

In addition, the support bracket 108 housing is formed with an air passage within that spans from a first side to a second side of the support bracket 108. The second end of the first conduit 106 is coupled to and in fluid providing communication with a corresponding upstream aperture at the first side of the support bracket 108, and a first end of the second conduit 110 is coupled to and in fluid receiving communication with a corresponding downstream aperture at the second side of the support bracket 108. A second end of the second conduit 110 is in fluid providing communication with the air compressor 112. Thus, the support bracket 108 may be used to provide a shorter air passage route from the inlet of the intake system to the air compressor 112 with relatively few components compared to conventional systems (e.g., incorporating solid brackets and circuitously routed airflow conduits).

Figure 2:
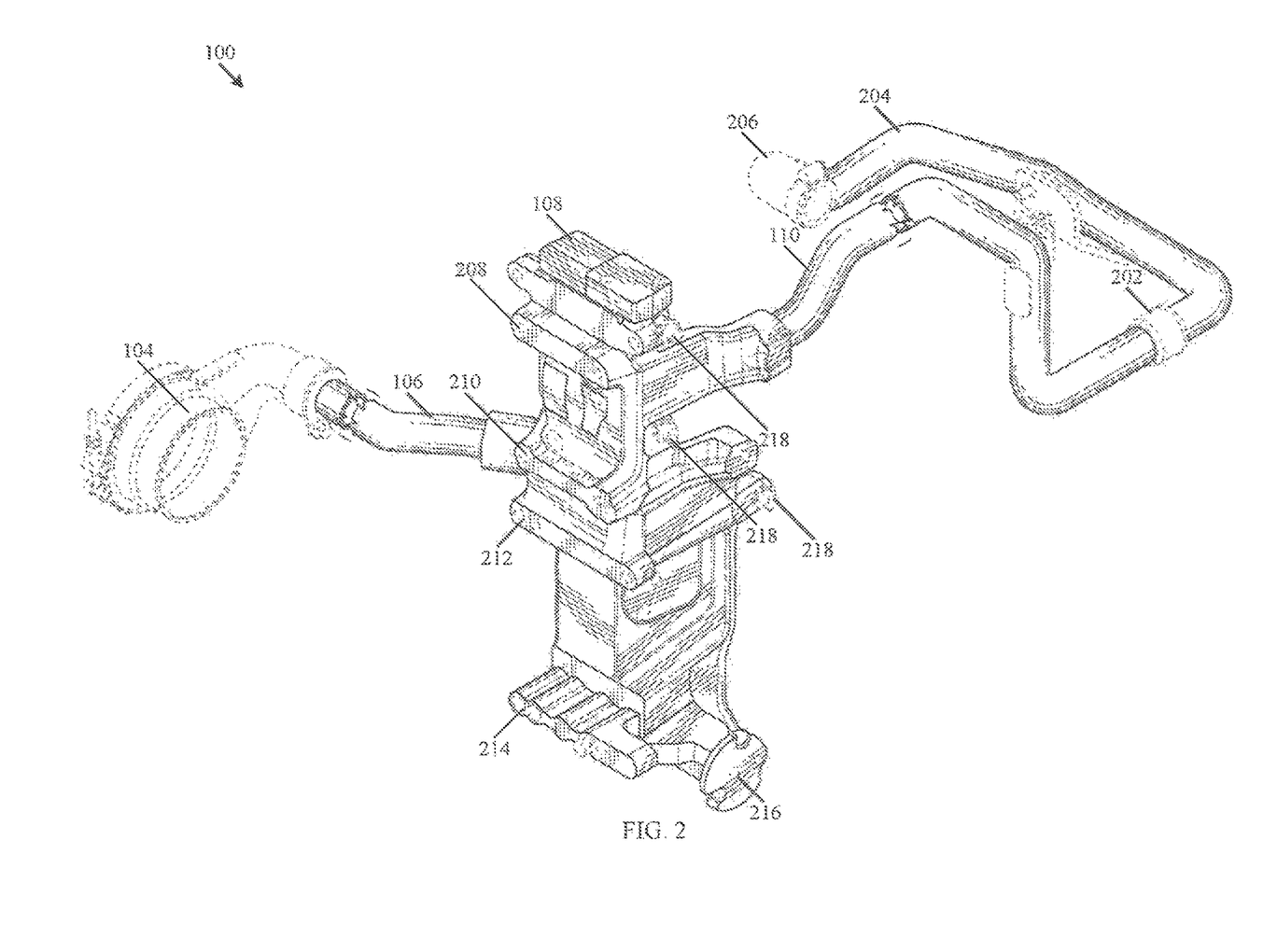
FIG. 2 is a perspective view of the accessory support and air routing system shown in FIG. 1.

Referring now to FIG. 2, the first conduit 106 and the second conduit 110 are structured to accommodate the positions and orientations of various other components of the engine 102 while coupled to the engine 102. In some arrangements, the first conduit 106 and the second conduit 110 are shaped (e.g., with one or more bends, curves, etc.) with respect to preexisting configurations of the engine 102, thereby allowing the system 100 to be retrofitted in various applications. Further, in some arrangements, one or both of the first conduit 106 and the second conduit 110 may include features facilitating assembly and disassembly. For example, in some such arrangements, the second conduit 110 includes a first segment 202 and a second segment 204. Each of the first segment 202 and the second segment 204 are configured to be removably coupled to the other, allowing for separate assembly and disassembly. In operation, the first segment 202 may be coupled to the support bracket 108 and maneuvered around adjacent components of the engine 102. The second segment 204 may be coupled to the air compressor 112 at an end coupler 206, and maneuvered around adjacent components of the engine 102. The first segment 202 may then be coupled to the second segment 204.

In addition to providing an air passage to communicatively couple the first conduit 106 to the second conduit 110, the support bracket 108 housing includes several other features structured to support the operation of the engine 102. The support bracket 108 may be coupled to the engine 102 via one or more fasteners 218 (e.g., bolts, clips, clamps, etc.) configured to engage the engine 102 (e.g., via threads, tabs, mounts, etc.). As used herein, "fasteners" refer to coupling assemblies that may include both a fastening device (e.g., bolts, screws, clips, clamps, etc.) and a corresponding coupling portion (e.g., threads, tabs, mounts, etc.) configured to removably or permanently join two or more members, directly or indirectly. In the arrangement shown in FIG. 2, the support bracket 108 housing includes a first mounting platform 208, a second mounting platform 210, a third mounting platform 212, and a fourth mounting platform 214. Each of the mounting platforms 208, 210, 212, 214 includes features structured to facilitate mounting and support of other components of the engine 102 (e.g., bolt holes and threads). One or more of the mounting platforms 208, 210, 212, 214 may also be formed to position a driven portion (e.g., a pulley) of a corresponding accessory device in an accessory drive. For example, the first mounting platform 208 and the second mounting platform 210 may respectively be configured to engage a top portion and a bottom portion of the Freon compressor 114 (e.g., as shown in FIGS. 1A and 1B). In turn, the third mounting portion 212 and the fourth mounting portion 214 may respectively be configured to engage a top portion and a bottom portion of the alternator 116 (e.g., as shown in FIGS. 1A and 1B). Pulleys at the Freon compressor 114 and the alternator 116 may then be communicatively coupled to one or more belts of an accessory drive. The support bracket 108 may be configured to mount these and/or other devices as well (e.g., belt tensioners, idler pulleys, fan shrouds, water pumps, etc.).

The support bracket 108 may further include a fifth mounting platform 216, which may be configured to engage a pulley. The fifth mounting platform 216 may be structured to provide a rotation point for the pulley, and to also position the pulley within an accessory drive. For example, in some arrangements, the fifth mounting platform 216 may be configured to engage an idler pulley. While mounted to the fifth mounting platform 216, the idler pulley may be used to position a drive belt of an accessory drive (e.g., to move the belt out of the way of other components).

Figure 3A:
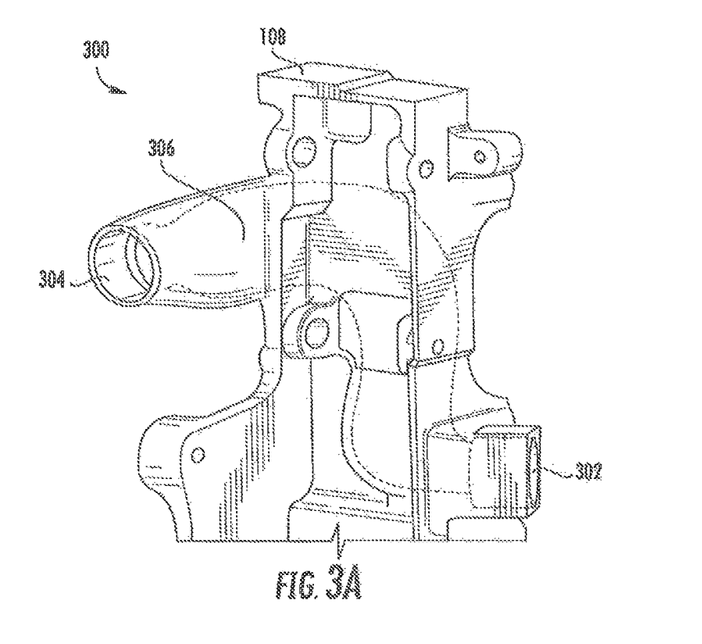
FIGS. 3A and 3B are semi-transparent views of portions of two example embodiments of a support bracket used in the accessory support and air routing system shown in FIGS. 1A, 1B, and 2.
Figure 3B:
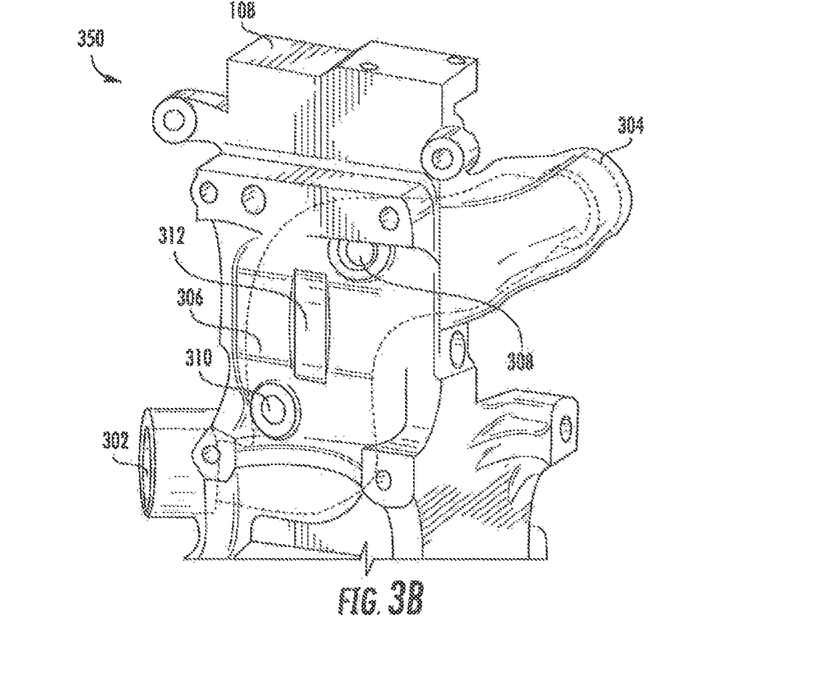

FIGS. 3A and 3B show example arrangements of a fluid passage 306 within the support bracket 108. In a first arrangement 300, the fluid passage 306 is formed within the support bracket 108, and may be formed adjacent, above, below, or laterally to one or more of the mounting platforms discussed with respect to FIG. 2. The fluid passage 306 is in fluid receiving communication with an upstream aperture 302 at a first end and in fluid providing communication with a downstream aperture 304 at a second end.

In various arrangements, the fluid passage 306 may be formed to consistently maintain a cross-sectional area that is equal to or similar to the cross-sectional area of one or both of the upstream aperture 302 and downstream aperture 304. In embodiments with a consistent cross-sectional area across the upstream aperture 302, the fluid passage 306, and the downstream aperture 304, fluid flows through the support bracket 108 may not result in a substantial increase or decrease in fluid pressure. The term "similar to" as used here with reference to a cross-sectional area indicates, for example, that a variance in the cross-sectional area is less than about 10% of the cross-sectional area, such as less than about 5% or less than about 2%. In some arrangements, the fluid passage 306 is formed to maintain at least a predetermined minimum cross-sectional area throughout (e.g., at least 600 mm$^2$, at least 650 mm$^2$, at least 1,000 mm$^2$, etc.). In some such arrangements, the fluid passage 306 may be formed to include portions where the cross-sectional area is greater or even significantly greater than the predetermined minimum cross-sectional area. Maintenance of at least the predetermined minimum cross-sectional area throughout the fluid passage 306 may prevent an appreciable pressure drop from the upstream aperture 302 to the downstream aperture 304 in operation. In addition, in some arrangements, portions of the fluid passage 306 may have a non-circular cross-sectional shape to conform to and fit within flat arrangements in a design of the support bracket 108. In some such arrangements, the fluid passage 306 may be formed to have an overall flat shape, which may curve within the support bracket 108 to provide a continuous conduit from the upstream aperture 302 to the downstream aperture 304.

Referring to FIG. 3B, a second arrangement 350 of the support bracket 108 is shown. Similar to the first arrangement 300, the second arrangement 350 includes a fluid passage 306 in fluid communication with an upstream aperture 302 and a downstream aperture 304. The second arrangement 350 of the support bracket 108 further includes an indent 312, a first mid-passage aperture 308, and a second mid-passage aperture 310. The indent 306 is shown by way of example of an external feature of the support bracket 108 that is formed to avoid contact or obstruction with another feature of the engine 102. For example, the indent 306 may be configured to prevent the support bracket 108 from contacting a housing portion of the Freon compressor 114 shown in FIG. 1A. In some arrangements, the indent 306 protrudes into and narrows a portion of the fluid passage 306. To maintain cross-sectional areas of the fluid passage 306 that include the indent 306, the fluid passage 306 may be widened accordingly (e.g., progressively wider as the indent 306 progressively protrudes into the fluid passage 306).

The support bracket 108 may include the first mid-passage aperture 308 and the second mid-passage aperture 310 where the support bracket 108 is formed via a semi-permanent mold casting process. In some such arrangements, a semi-permanent core is formed to match the shape of the fluid passage 306. Example materials of the semi-permanent core include sand, which may be used in combination with one or more binders (e.g., various oils, cereal, clay, etc.). Further, in some arrangements, the semi-permanent core may be formed to include the first mid-passage aperture 308 and the second mid-passage aperture 310. Portions of the semi-permanent core corresponding to the first mid-passage aperture 308 and the second mid-passage aperture 310 may resemble cylindrical extensions from the rest of the core. The semi-permanent mold may be placed in a metal mold corresponding to the external features of the support bracket 108. In some arrangements, the cylindrical extensions of the core corresponding to the first mid-passage aperture 308 and the second mid-passage aperture 310 may be coupled to the metal mold to determine the location of the fluid passage 306 within the support bracket 108. Molten metal (e.g., aluminum) may then be poured into the metal mold to create the support bracket 108. The semi-permanent mold may then be broken up within the support bracket 108 (e.g., via vibration), and the resulting particulate matter (e.g., sand particles) may be removed through the upstream aperture 302 and the downstream aperture 304, as well as the first mid-passage aperture 308 and the second mid-passage aperture 310. The first mid-passage aperture 308 and the second mid-passage aperture 310 may be closed via corresponding plugs, and/or coupling the support bracket 108 to the engine 102 (e.g., where the first mid-passage aperture 308 and the second mid-passage aperture 310 are disposed toward a wall portion of the engine 102).

Figure 4:
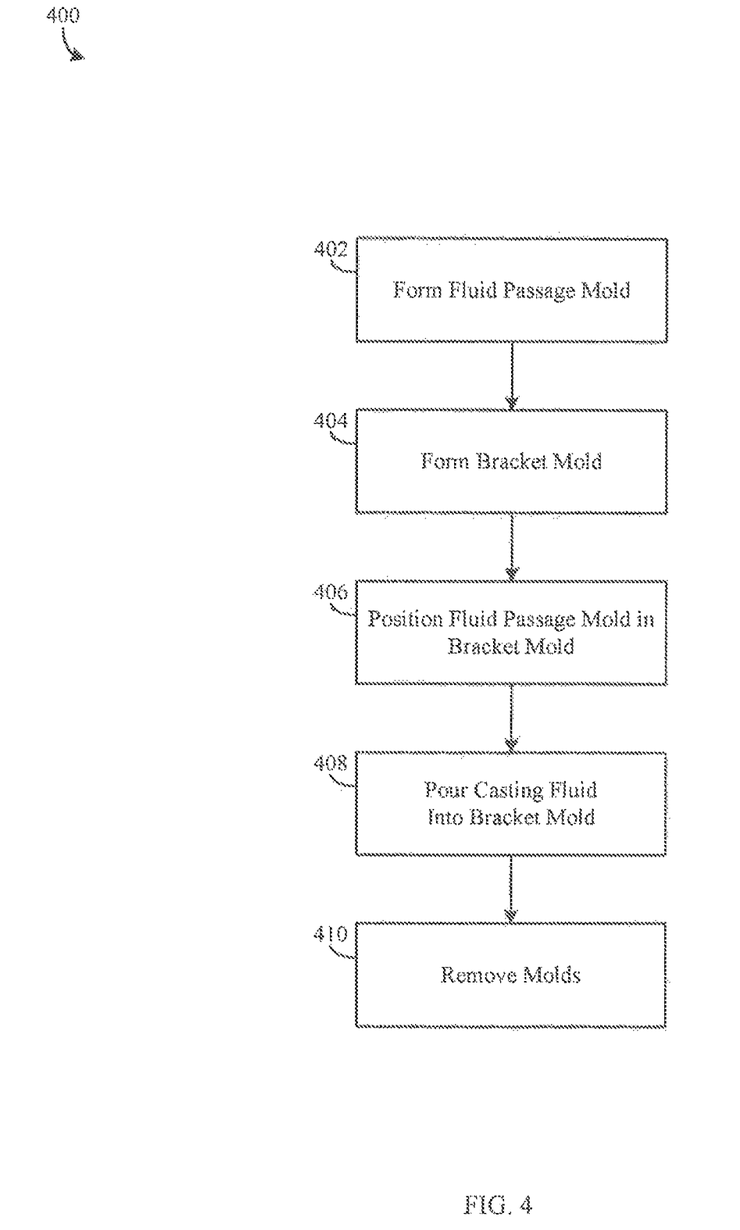
FIG. 4 illustrates a flow diagram showing a method of forming a support bracket, according to an example embodiment.

FIG. 4 illustrates a flow diagram showing a method 400 of forming a support bracket (e.g., the support bracket 108) in accordance with example embodiments. At 402, a mold of a fluid passage (e.g., the fluid passage 306) of the support bracket is formed. The mold may be formed as a semi-permanent mold, and may be formed of materials including sand and one or more binders. The mold may be formed to include portions corresponding to an upstream aperture (e.g., the upstream aperture 302), the downstream aperture (e.g., the downstream aperture 304), a first mid-passage aperture (e.g., the first mid-passage aperture 308), and a second mid-passage aperture (e.g., the second mid-passage aperture 310).

At 404, a mold of the support bracket is formed. The mold of the support bracket is formed to include portions corresponding to exterior features of the support bracket. In various arrangements, the mold of the support bracket may include portions corresponding to fasteners (e.g., for the one or more fasteners 218 for coupling the support bracket to the engine 102) and mounting points for other components (e.g., the mounting platforms 208, 210, 212, 214, 216). In some arrangements, the mold of the support bracket includes portions corresponding to mounting points for accessory devices (e.g., the mounting platforms 208, 210, 212, 214) and mounting points for pulleys (e.g., the fifth mounting platform 216).

At 406, the fluid passage mold is positioned in the bracket mold. The fluid passage mold may be positioned at a location that corresponds to the final position of the fluid passage within the support bracket. In some arrangements, the fluid passage mold is positioned within the bracket mold by coupling at least one protrusion of the fluid passage mold that corresponds to a mid-passage aperture to the bracket mold.

At 408, casting fluid is poured into the bracket mold. Casting fluid includes any of various fluids selected to be able to set under certain conditions, and may include various types of molten metal or alloys there of (e.g., aluminum). The casting fluid is poured into the bracket mold and around the fluid passage mold, and then allowed to solidify and set.

At 410, the molds are removed. In some arrangements, the bracket mold may be removed by splitting or breaking apart the bracket mold around the casted support bracket. In addition, the fluid passage mold may be removed by breaking up the materials forming the semi-permanent mold. In some arrangements, the fluid passage mold may be subject to vibrations or shocks, and the resulting particulate matter may be flushed out from the support bracket (e.g., via one or more mid-passage apertures, or the upstream and/or downstream apertures).

For the purpose of this disclosure, the terms "coupled," "engaged," and "mounted" means the joining of two members directly or indirectly to one another. Such joining may be stationary or moveable in nature. Such joining may be achieved with the two members, or the two members and any additional intermediate members, being integrally formed as a single unitary body with one another, or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A method of forming an internal combustion engine support bracket, the method comprising:
    forming a semi-permanent passage mold corresponding to a fluid passage configured to be in fluid receiving communication with an upstream aperture and in fluid providing communication with a downstream aperture;
    forming at least one cylindrical extension extending from the semi-permanent passage mold, the at least one cylindrical extension defining at least one mid-passage aperture;
    forming a bracket mold corresponding to a support bracket comprising at least one mounting platform configured to receive fasteners, the fasteners configured to removably engage an accessory device of the internal combustion engine;
    positioning the semi-permanent passage mold within the bracket mold;
    pouring casting fluid into the bracket mold; and
    removing the bracket mold and the semi-permanent passage mold, wherein the semi-permanent passage mold is broken down prior to removal.

2. The method of claim 1, wherein the at least one mounting platform is configured to position a driven portion of the accessory device in an accessory drive.

3. The method of claim 1, wherein the at least one mounting platform includes a first mounting platform configured to removably engage the accessory device and a second mounting platform configured to removably engage an idler pulley operatively coupled to an accessory drive.

4. The method of claim 1, wherein the semi-permanent passage mold defines the fluid passage to have similar cross-sectional areas normal to an anticipated airflow within and along the fluid passage from the upstream aperture to the downstream aperture.

5. The method of claim 4, wherein the cross-sectional areas of the fluid passage are similar to a cross-sectional area of the upstream aperture and a cross-sectional area of the downstream aperture.

6. The method of claim 4, wherein the semi-permanent passage mold defines the fluid passage to have a flat configuration between the upstream aperture and the downstream aperture.

7. The method of claim 4, wherein the semi-permanent passage mold defines an indent extending toward the fluid passage, and wherein a first cross-sectional area of the fluid passage that includes the indent is similar to a second cross-sectional area of the fluid passage that does not include the indent.

8. The method of claim 1, wherein the semi-permanent passage mold is removed at least in part through the at least one mid-passage aperture.

9. The method of claim 8, wherein the semi-permanent passage mold is positioned within the bracket mold by coupling a portion of the semi-permanent passage mold corresponding to the at least one mid-passage aperture to the bracket mold.

10. A method of forming an internal combustion engine support bracket, the method comprising:
    forming a semi-permanent passage mold corresponding to a fluid passage configured to be in fluid receiving communication with an upstream aperture and in fluid providing communication with a downstream aperture, the semi-permanent passage mold defining at least one mid-passage aperture;
    forming a bracket mold corresponding to a support bracket comprising at least one mounting platform configured to receive fasteners, the fasteners configured to removably engage an accessory device of the internal combustion engine;
    positioning the semi-permanent passage mold within the bracket mold by coupling a portion of the semi-permanent passage mold corresponding to the at least one mid-passage aperture to the bracket mold;
    pouring casting fluid into the bracket mold; and
    removing the bracket mold at least in part through the at least one mid-passage aperture; and
    removing the semi-permanent passage mold, wherein the semi-permanent passage mold is broken down prior to removal.

11. A method of forming an internal combustion engine support bracket, the method comprising:
    forming a semi-permanent passage mold corresponding to a fluid passage configured to be in fluid receiving communication with an upstream aperture and in fluid providing communication with a downstream aperture, wherein the semi-permanent passage mold defines the fluid passage to have similar cross-sectional areas normal to an anticipated airflow within and along the fluid passage from the upstream aperture to the downstream aperture;
    forming at least one cylindrical extension extending from the semi-permanent passage mold, the at least one cylindrical extension defining at least one mid-passage aperture;
    forming a bracket mold corresponding to a support bracket comprising at least one mounting platform configured to receive fasteners, the fasteners configured to removably engage an accessory device of the internal combustion engine;
    positioning the semi-permanent passage mold within the bracket mold, wherein the semi-permanent passage mold defines an indent extending toward the fluid passage, and wherein a first cross-sectional area of the fluid passage that includes the indent is similar to a second cross-sectional area of the fluid passage that does not include the indent;
    pouring casting fluid into the bracket mold; and
    removing the bracket mold and the semi-permanent passage mold, wherein the semi-permanent passage mold is broken down prior to removal.

* * * * *